(No Model.) 5 Sheets—Sheet 3.
J. A. HORTON.
WIRE NAIL MACHINE.
No. 423,254. Patented Mar. 11, 1890.
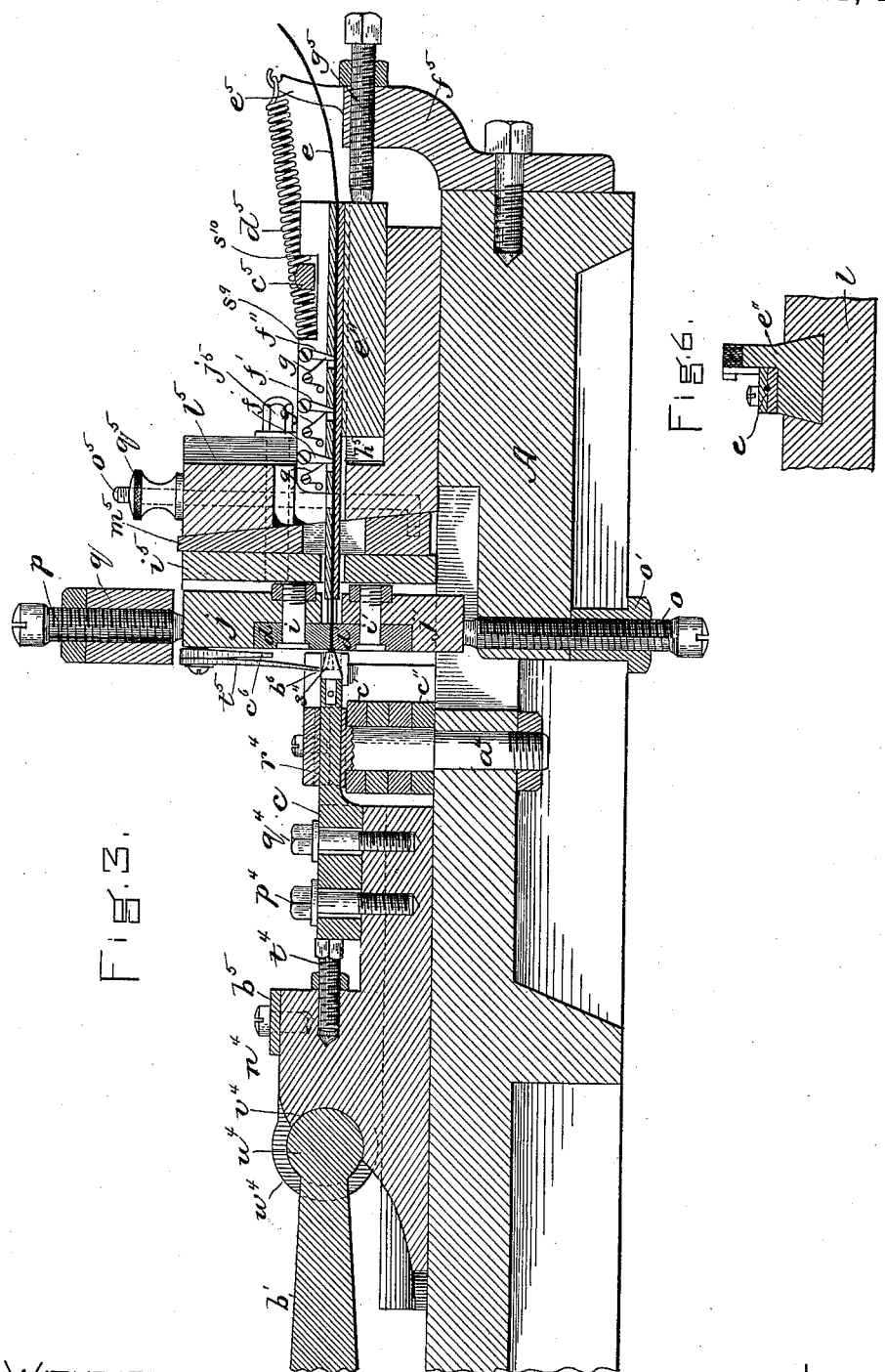
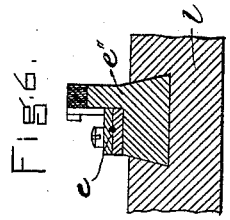

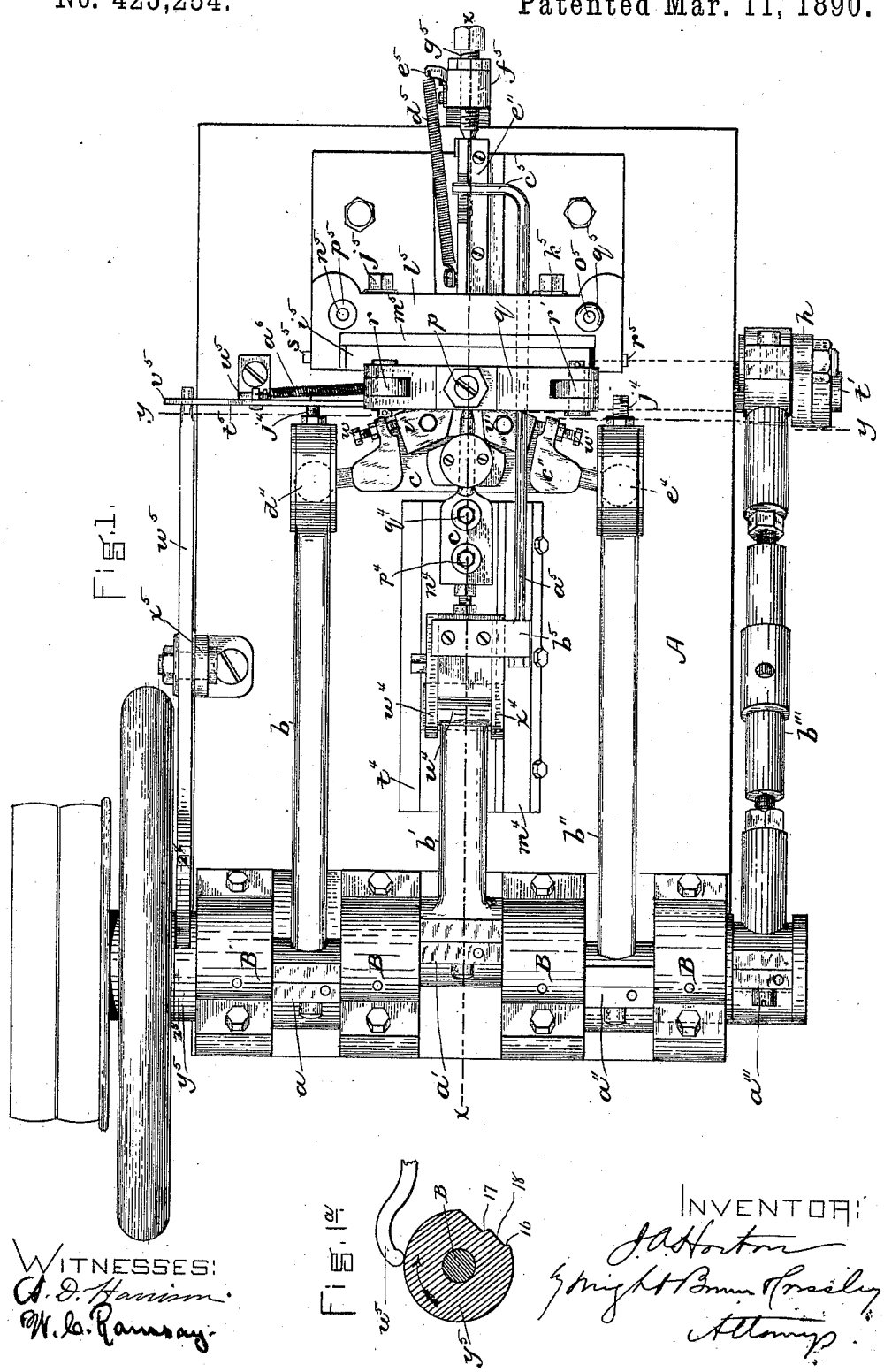

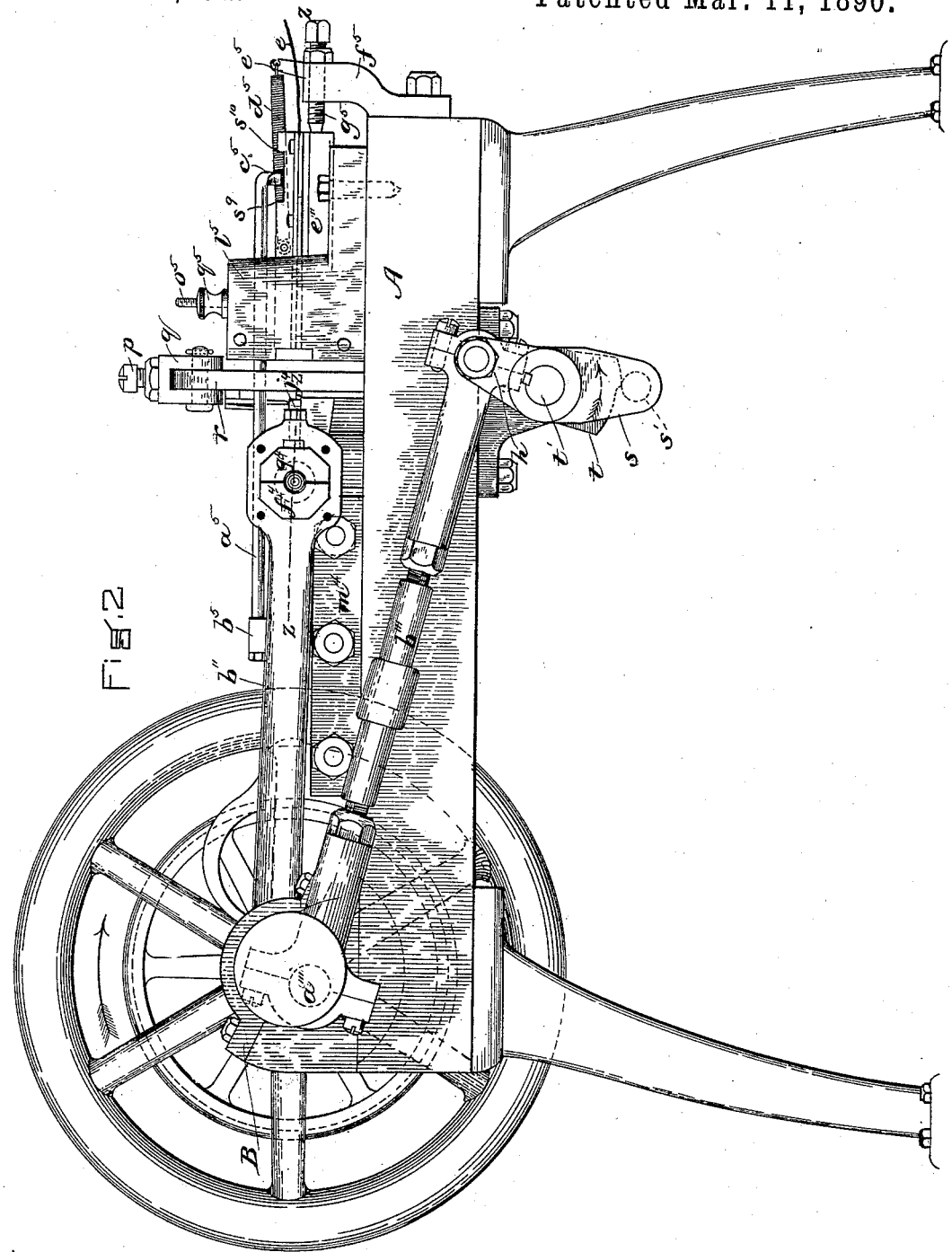

(No Model.)
5 Sheets—Sheet 4.
J. A. HORTON.
WIRE NAIL MACHINE.
No. 423,254.
Patented Mar. 11, 1890.
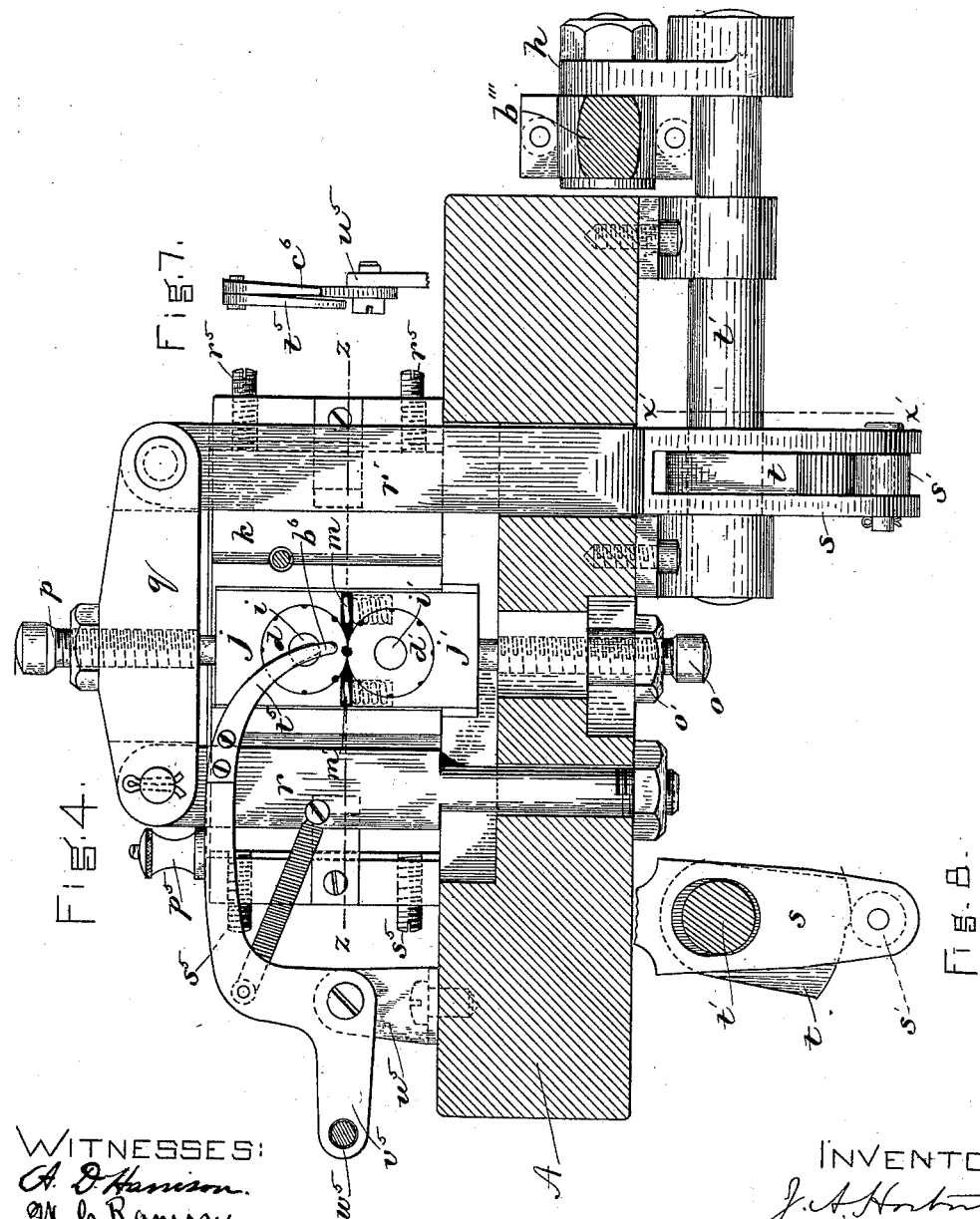
WITNESSES:
INVENTOR:

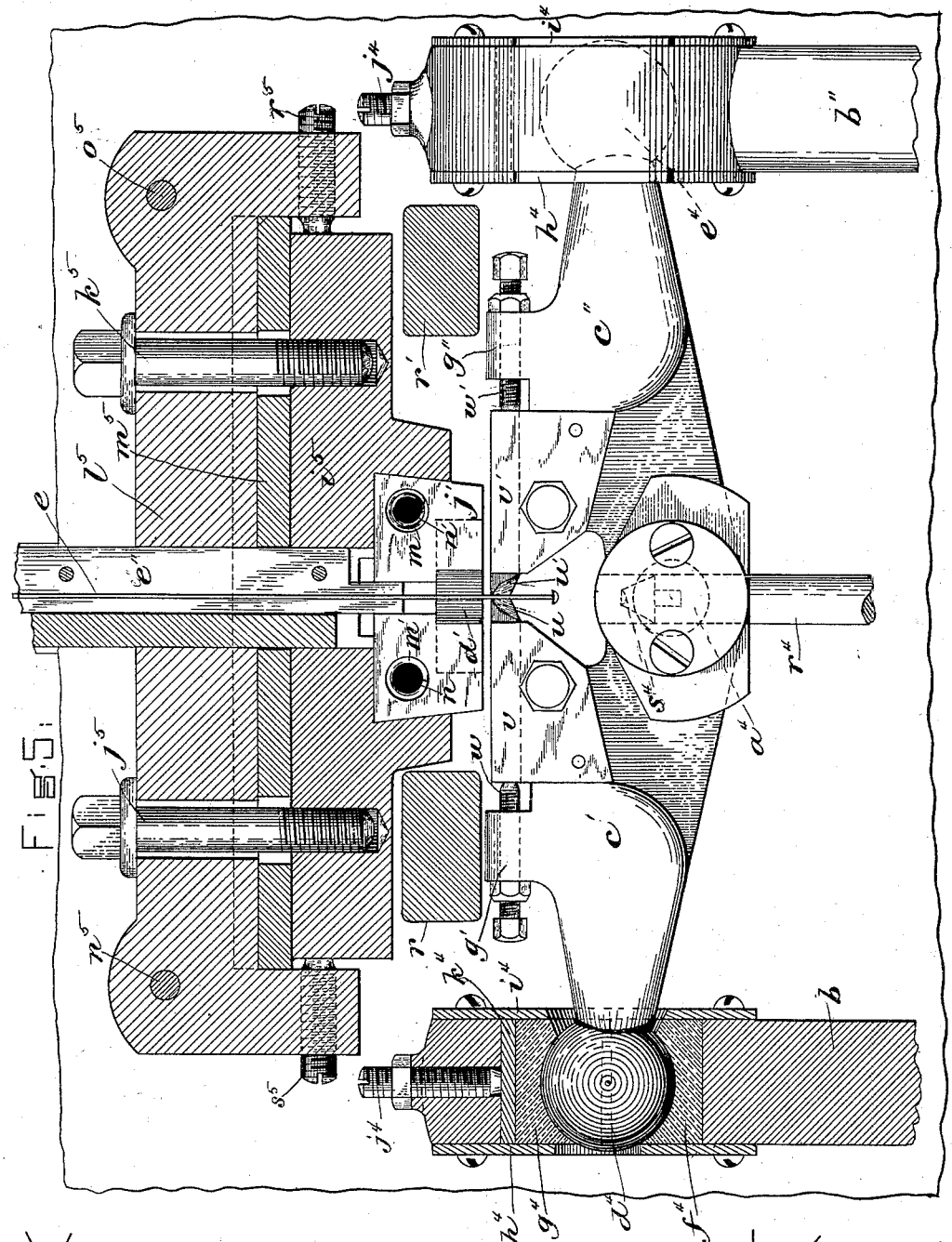

UNITED STATES PATENT OFFICE.

JAMES A. HORTON, OF READING, MASSACHUSETTS, ASSIGNOR TO CHARLES F. BAKER.

WIRE-NAIL MACHINE.

SPECIFICATION forming part of Letters Patent No. 423,254, dated March 11, 1890.

Application filed March 14, 1889. Renewed February 7, 1890. Serial No. 339,519. (No model.)

*To all whom it may concern:*

Be it known that I, JAMES A. HORTON, of Reading, in the county of Middlesex and State of Massachusetts, have invented certain new and useful Improvements in Wire-Nail Machines, of which the following is a specification.

This invention relates to machines for making wire nails; and it has for its object the provision of a machine which shall be positive in its action, simple in construction, and capable of rapid operation, with the minimum of friction or wear.

The invention consists, first, in the improved means whereby the cutting and pointing dies are operated.

The invention consists, secondly, in the combination, with the cutting, gripping, heading, and wire-feeding devices, of a driving-shaft provided with cranks and connecting-rods, through which movement is imparted to said devices from said cranks, the latter being so arranged on said shaft as that said devices are governed entirely by the rotation of the driving-shaft.

The invention also consists in various minor improvements in the operative parts of the machine, all of which I will now proceed to describe in connection with the accompanying drawings, forming a part of this specification.

In said drawings, Figure 1 represents a top plan view of a nail-machine embodying my improvements. Fig. 1ᵃ represents a section on line $2^s\ 2^s$, Fig. 1. Fig. 2 is a side elevation of the same. Fig. 3 is a section on line $x\ x$ of Fig. 1. Fig. 4 is a cross-section on line $y\ y$ of Fig. 1. Fig. 5 is an enlarged view, partly in plan and partly in section, on the line 2 2 of Fig. 2. Figs. 6 and 7 are detailed views; and Fig. 8 is a section on line $x\ x$ of Fig. 4.

Referring to Fig. 1 of the drawings, A represents the bed of the machine, having bearings B thereon, in which is journaled a driving-shaft provided with four cranks $a\ a'\ a''\ a'''$, to which are attached connecting-rods $b\ b'\ b''\ b'''$, through which said cranks impart motion to the different parts of the machine, as hereinafter described. The central crank $a'$, through its attached connecting-rod $b'$, imparts a reciprocating movement to the "header" $c$. The cranks $a\ a''$ operate the cutting-die levers $c'\ c''$, while the remaining crank $a'''$ operates the holding or gripping dies $d\ d'$ through intermediate devices, hereinafter described.

$e$, Fig. 3, represents the wire to be operated upon, said wire being drawn from a coil as fast as required and inserted in a feeding-carriage $e'$. (Shown in cross-section in Fig. 6.) Said carriage is adapted to slide in guides formed in a supporting-block $l$ by means hereinafter described, the arrangement being such that the carrier is moved forward the distance required for the length of one nail carrying the wire therewith. To the carrier are attached a series of pawls $f f' f''$, preferably three or more in number, and so arranged that their bottom ends will grip the wire when the carriage is moved forward, (or in the direction marked thereon,) and will prevent the slipping of the wire on the carriage and insure the movement of the wire the exact distance traveled by the carriage, thus preventing liability of making nails of varying length. Said pawls are adapted to swing on the screws which secure them to the carriage $e'$, and are pressed against the wire by small springs $g$, secured to the carrier. The angle of the pawls when in contact with the wire is such as to insure a gripping action thereon during the time that the wire is being carried forward, and a prompt release of said gripping action when the feeding-carriage moves backwardly, as will be readily understood by reference to Fig. 3. The carrier is reciprocated by a connection with the header-operating connecting-rod $b'$, as hereinafter described.

$d\ d'$ represent gripping-dies, which may be of any suitable form, and are in this case shown as disks secured by bolts $i\ i'$ to blocks $j\ j'$, adapted to slide longitudinally in a holder $k$, as shown in Figs. 4 and 5. Said blocks $j j'$ are counterbored for the reception of the dies $d\ d'$, the arrangement being such that only sufficient surface of the dies to engage the wire is exposed at the ends of the blocks, thus affording a firm support for said dies, as will be readily understood by reference to Figs. 3, 4, and 5. Between the blocks $j j'$ is a suitable aperture for the admission of the wire between the dies. The dies $d\ d'$ are provided with a series of peripheral cavities formed to receive and grasp the wire, the dies being capable of rotation to bring any of their cavities into position to grasp the wire, so that when one cavity becomes unfit for use by wear another can be moved into its place.

The blocks $j\ j'$ are normally kept apart when pressure is not applied to them for the gripping action by spiral springs $m\ m'$, inserted in holes $n\ n'$, formed in the lower block, and exerting an upward pressure against the lower surface of the upper block, as shown in Fig. 4. This normal opening of the dies permits the wire to be fed forward the length of the nail to be formed before being gripped by said dies and previous to the action thereon of the pointing and cutting dies.

The gripping-dies are closed upon the wire for the heading operation by means of the following devices: By reference to Fig. 4 it will be seen that the lower die-block $j'$ is supported by a bolt $o$, tapped through the bed of the machine, and held in any position in which it may be adjusted by a jaw-nut $o'$. Said bolt acts as a support for said block, and also affords means for adjusting the same vertically, thereby enabling the height of the meeting surfaces of the dies to be adjusted. A similar bolt $p$ is tapped through a lever $q$, which is located above the upper die-block $j$ and rests upon the upper side of the latter. Said lever is pivoted at one end to a stud or post $r$, which is affixed to the bed A, and at the other end to a vertically-movable rod $r'$. The rod $r'$ passes down through the bed of the machine, and has formed upon its lower end a yoke $s$. A roller $s'$ is fitted to rotate in the lower end of said yoke and bears on a cam $t$ on a rock-shaft $t'$, said shaft passing through the yoke, which is slotted longitudinally, as shown in Fig. 8. The cam $t$ is oscillated by means presently described, and its movement in one direction depresses the rod $r'$, and through the lever $q$ and screw $p$ forces the upper die-holder down toward the lower die-holder, and thus causes the gripping action of the dies $d\ d'$ on the wire while the latter is being pointed, cut, and headed.

The rock-shaft $t'$ is operated from the main shaft by means of the crank $a'''$, Fig. 2, through an adjustable connecting-rod $b'''$, extending from said crank to an arm $h$, secured to the outer end of the rock-shaft $t'$, to which said rod is pivoted.

The grippers normally separated by spring-pressure, and the gripper-operating mechanism composed of the cam oscillated by a connection with a crank on the driving-shaft and the connections through which pressure is communicated from said cam to the spring supported or displaced gripping-die, constitute an important part of my invention. It is necessary for the rapid operation of the machine that the grippers be closed and opened very quickly, and after careful study and experiment I have arrived at the conclusion that by the employment of the oscillating cam in connection with the spring-separated gripping-dies the maximum rapidity of the opening and closing movements of the dies is attained.

$u\ u'$, Fig. 5, represent the cutting and pointing dies, which are suitably secured to levers $c'\ c''$ by clamping-plates $v\ v'$, bolted and doweled to said die-blocks. The dies are backed by adjusting-screws $w\ w'$, inserted in lugs $g'\ g''$ on the levers. Said levers are pivoted at their inner ends on a bolt $a^4$, which bolt is secured to the bed of the machine in the manner shown in Fig. 3. The cutting-dies $u\ u'$, which may have the usual form of dies for severing wire and forming a point on the severed portion, are located as close as is practicable to the bolt or pivot $a^4$, on which the cutter-levers oscillate, and are arranged to meet each other and act on the wire at one side of said pivot, the levers $c'\ c''$ being offset or extended at said side, as shown in Fig. 5. Said offset or extended portions may be termed the "shorter arms" of the levers $c'\ c''$. The main portions of the levers between their pivoted and outer ends extend much farther from the pivot than the portions to which the dies $u\ u'$ are attached and constitute the longer arms of the levers. Said longer arms have spherical enlargements at their outer ends, which are fitted in corresponding sockets in connecting-rods $b\ b''$, through which power is applied to the levers $c'\ c''$ to operate the dies, said rods being connected with cranks on the driving-shaft, as above described, so that by the rotation of said shaft power is applied to the longer arms of said levers. It will be observed that the pivoted levers $c'\ c''$, having the longer and shorter arms, and the cutting-dies located close to the pivot, resemble closely a pair of cutting-nippers with their levers or handles bent outwardly and extending in opposite directions from the pivot or fulcrum. This arrangement, besides utilizing the power to the best advantage, enables said power to be applied from cranks on the driving-shaft through the parallel connecting-rods operated directly by said cranks and moving at right angles with the driving-shaft. I thus avoid the use of cams on the driving-shaft and reduce the friction and wear of the cutting-die-operating mechanism to the minimum.

The connecting-rods $b\ b''$ are provided with sockets which receive the spherical ends of the cutter-levers. Said sockets (one of which is shown in section in Fig. 5) are provided with boxes of Babbitt metal, each preferably cast in two sections $f^4\ g^4$, which are recessed to fit the ball received by the socket.

The box-sections are kept in position by plates $h^4\ i^4$, secured to the sides of the rod $b$, the plates and box-sections on the inner side of the rods being cut away to permit of the free movement of the arm $b^4$ when the rod $b$ is reciprocated, as will be readily understood.

In Fig. 2 I have shown the rod $b''$ with the outer securing-plate removed, showing a side view of the boxes $g^4\ f^4$ in position in the rod.

To provide for wear of the boxes $g^4\ f^4$, I leave an open space between the same and provide a set-screw $j^4$, passing through the end of the rod and bearing on a plate or follower in contact with the box.

Fitted to slide in guides $l^4$ $m^4$, secured to the bed of the machine, is a header block or carrier $n^4$, to one end of which is suitably connected the rod $b'$, through which the central crank $a'$ imparts a reciprocating motion to said block. To the latter is secured by bolts $p^4$ $q^4$ the header shank or holder $c$, having at its forward end the die $s^4$, which forms the head upon the wire. The forward portion of the holder $c$ is formed to slide in a guideway or socket extending through the upper portion or head of bolt $a^4$, to which the cutting-die levers $c'$ $c''$ are pivoted, Fig. 3. The die $s^4$ is removably attached to the forward end of the holder $c$, so that dies of different form, adapted to make either round or flat headed nails, as required, may be used interchangeably. The removability of the heading-die also enables it to be replaced by a new one when worn out.

The header-holder is adjustably secured to a block or carrier $n^4$ by the bolts $p^4$ $q^4$, the holes through which said bolts pass being enlarged, so as to permit a limited adjustment of the header-holder and the header thereto attached in any direction. A set-screw $t^4$ in a shoulder formed on the header-carrier bearing against the header-holder at its rear end and secured in place by a jaw-nut prevents the header from receding during the heading process and relieves the bolts $p^4$ $q^4$ from undue strain. Said screw also affords accurate means for adjusting the header toward or from the dies $d$ $d'$.

At the point of connection of the rod $b'$ with the header-carrier $n^4$ the rod is provided with a rounded end $u^4$, formed integral therewith and fitting a half-round groove $v^4$ in said carrier, the arrangement being such that an extended bearing-surface is provided for the end of the rod to receive the shocks of the heading operation and to avoid the liability of wear and lost motion attendant upon the use of the usual connecting devices. Said rounded ends project out on each side of the rod into sockets formed in the plates $w^4$ $x^4$, Fig. 1, which are secured to each side of the header-carrier for the purpose of retracting the latter, and as there is no power to be applied by the header during its backward movement all that is required of the plates is simply to hold the rod and header-block in connection with each other.

It will be seen that by the connection above described I am enabled to provide against excessive wear and frequent adjustment of the travel of the header-carrier.

The feeding-carriage is operated by a rod $a^5$, secured at one end to a lug $b^5$ on the header-carrier and having an arm $c^5$ at its opposite end projecting between two shoulders $s^9$ $s^{10}$, formed on the feeding-carriage, as shown in Figs. 1, 2, and 3. A spring $d^5$ is attached to carriage $e^2$ at one end, and at the other end to an arm $e^5$, secured to the frame of the machine, the arrangement being such that when the heading-die has formed a head upon the wire and moves backwardly (the attached rod $a^5$ moving therewith) the arm $c^5$ on the outer end of said rod is brought into contact with the shoulder $s^9$ of the feed-carriage and moves the same forward; and when said arm moves in the opposite direction the carriage is retracted by the spring until its rear end bears against an adjustable stop-screw $g^5$. Said screw is inserted in a fixed bracket $f^5$, and by being adjusted regulates the length of the nails by determining the extent of the backward movement of the feed-carriage.

It will be seen by reference to Fig. 3 that the travel of the feeding-carriage in the direction of its length toward the dies is limited by the space $h^5$, and therefore if a longer nail is to be formed the adjusting-screw is retracted proportionally, thus permitting the carriage to be drawn farther back, and consequently take a longer length of wire for the next nail.

The gripping-die holders are held toward or from the header by an adjustable holder $i^5$, Fig. 5, secured by bolts $k^5$ $j^5$ to a support 15, which is bolted to the bed of the machine. Said holder is adapted to be adjusted toward or from the header by a wedge-shaped casting $m^5$, adapted to be raised and lowered by bolts $n^5$ $o^5$, extending downwardly through the support $l^5$ and bent at right angles at their bottom ends to engage the wedge, and having thumb-nuts $p^5$ $q^5$ on their upper ends, as shown in dotted lines in Fig. 3. When necessary to move the adjusting-wedge, the bolts $j^5$ $k^5$ are loosened, which permits of the free action of the wedge, and when the proper adjustment is secured the same bolts are tightened and keep the holder securely in position. The holder $i^5$ is adapted to lateral adjustment by set-screws $r^5$ $s^5$ at either side, whereby the gripping-dies may be accurately maintained in a central position, the adjustment being secured by loosening the bolts $k^5$ $j^5$, as before described in relation to the wedge, and turning in one set-screw, while the opposite one is proportionally turned out, or vice versa, as shown in Figs. 4 and 5.

In pointing and cutting off the nail it not infrequently happens that the nail is not entirely severed from the wire, but adheres thereto by a thin fin or a sufficient quantity of the material to prevent it from dropping off the wire. To effect the detachment of the nail, I provide what I term a "knocking-off" lever $t^5$, Fig. 4, pivoted to a support $u^5$ on the frame of the machine and provided with an arm $v^5$ at its outer end, which arm engages a rod $w^5$, Fig. 1, pivoted at its center to a support $x^5$, also secured to the base of the machine, its opposite end bearing on a cam $y^5$ on the driving-shaft. A spring $a^6$, attached to the lever $t^5$ at one end and attached at its other end to the rod $r$, exerts sufficient pressure upon the lever, and through the latter upon the rod $w^5$, to keep the end of said rod in contact with the cam $y^5$. Said cam is so timed that when the cutting and pointing operation has taken place the receding portion of the latter permits the rod $w^5$ to be depressed at the end which bears on the cam $y^5$, and with the support $x^5$ as a fulcrum the opposite end of said rod is raised a corresponding distance, the force of the spring being sufficient to effect this movement, as described. The inner end of the lever $b^6$ is thus forced downwardly by the spring against the completed nail and detaches the same from the wire. The lever is also provided with a shorter portion or finger $c^6$, which strikes and detaches the "scrap" or wash from the wire after the nail has been severed, leaving a smooth surface for the head of the succeeding nail, said finger being located at a higher point than the nail-detaching end of the lever, and therefore striking the scrap after the nail has been detached from the wire.

When the above-described movements have taken place, the enlarged portion of cam $y^5$ raises the end portion of rod $w^5$ bearing on it and depressing the opposite end of said rod. The lever is thus raised from the depressed position last described to that shown in Fig. 4 to allow the feeding of the wire and the operation of the header, which is in readiness to operate upon the wire. The cam $y^5$ is preferably formed to briefly arrest the depression of the lever $b^6$ after the nail has been detached, so that the finger $c^6$ does not reach and strike the scrap until the cutting-dies have had time to open and release the same, the lever being further depressed to knock off the scrap after the cutting-die is opened.

Fig. 1ᵃ shows the form of the cam $y^5$, in which the receding portion, which permits the nail-detaching depression of the knocking-off lever, is marked 16, while the second receding portion, which permits the scrap-detaching depression, is marked 17, the intermediate portion 18 being formed to arrest the lever while the cutting-dies are opening.

In the operation of the machine, the wire being inserted in the feeding-carriage, the header-block is moved back by the rotation of its crank, carrying with it the feeding-rod, the arm of which engages with the feeding-carriage, causing the same to be moved toward the gripping-dies to the full extent of its travel and inserting the wire between the dies, which are held apart by the springs already described. The dies are now closed upon the wire, and (as the first nail formed will necessarily be without a head) the cutting and pointing dies $u$ $u'$ are brought into contact with the wire through their operating devices and point and cut the nail and also square the end of the wire. The dies $u$ $u'$ are now withdrawn from the wire and the knocking-off lever is depressed by the means described and strikes the nail, causing it to be detached from the wire should it adhere thereto, after which the shorter point or finger $c^6$ separates the scrap or waste should it adhere to the wire. The knocking-off lever then immediately resumes its normal position, leaving the end of the wire projecting through the gripping-dies a sufficient distance for the head of the succeeding nail. At this point the heading-die is moved forward and forms the head for the next nail. The gripping-dies close upon the wire as soon as it is fed forward, and remain closed during the pointing and heading operations. The feeding-carriage is moved back to take a fresh hold on the wire while the header is advancing. After the head is formed the gripping-dies release the wire, which is brought forward the length of the following nail, and thus the operation is repeated.

It will be seen that all the operative parts of the machine, excepting the knocking-off lever, are operated by the cranks on the driving-shaft through the described connecting devices. The employment of cams on the driving-shaft and the wear and friction incident thereto are thus avoided, the construction is simplified, and the maximum rapidity of operation is attained.

I claim—

1. In a wire-nail machine, the combination, substantially as set forth, of a pair of cutting-nippers fitted to oscillate on a center or pivot which is common to both and having their longer arms extended outwardly in opposite directions from the pivot, a driving-shaft having cranks, and parallel connecting-rods which communicate motion from said cranks to the longer arms of the cutting-nippers.

2. In a wire-nail machine, the pivoted levers having shorter and longer arms fitted to oscillate on a center which is common to both, cutting and pointing dies secured to said shorter arms, and means whereby power is applied to said longer arms to force said dies into the wire, as set forth.

3. In a wire-nail machine, the combination of the cutter-levers connected to a fixed support at their inner ends by a center or pivot which is common to both, power-applying rods engaged with the outer ends of said levers, and cutting and pointing dies secured to said levers between their inner and outer ends, as set forth.

4. In a wire-nail machine, the combination of the cutter-levers connected to a fixed support at their inner ends by a center or pivot which is common to both, power-applying rods having sockets engaged with the spherical outer ends of said levers, and a driving-shaft having cranks engaged with said rods, as set forth.

5. In a wire-nail machine, a driving-shaft having a series of short-motion cranks, a series of connecting-rods operated by said cranks, and two levers fitted to oscillate on a center which is common to both and provided on their shorter arms with wire cutting and pointing dies, wire-gripping dies, a heading-die, and a feeding device, all connected with and operated by said connecting-rods, as set forth.

6. The combination of the gripping-dies normally separated by springs, the rocking cam supported by fixed bearings, the lever $q$ and rod $r'$, whereby motion is communicated from said cam to the displaced gripping-die, the driving-shaft having a crank $a'''$, and connections between said crank and cam whereby the latter is oscillated by the rotation of the driving-shaft, as set forth.

7. In a wire-nail machine, the combination, with the wire-cutting dies and the header, of the gripping-dies, a gripping-die holder which is movable toward and from the cutting-dies and header, the wedge $m^5$, interposed between said holder and a fixed support, and means for adjusting said wedge and thereby varying the distance between the gripping-dies and the cutting-dies and header, as set forth.

8. In a wire-nail machine, the combination, with the wire-cutting dies and the header, of the gripping-dies, a movable holder therefor, the fixed bracket or flange 15, supporting said holder, and the adjusting-screws in said bracket, whereby the die-holder is supported in any position to which it may be laterally adjusted.

9. The combination, with the cutting and gripping dies and the header, of the nail detaching or knocking lever, a spring whereby said lever is depressed to detach the nail, and the cam $y^5$ on the driving-shaft, and the pivoted lever $w^5$, bearing at one end on said cam and engaged at the other end with the nail-detaching lever, whereby said lever is positively raised and caused to avoid the header, as set forth.

10. The combination, with the cutting and gripping dies and the header, of the nail detaching or knocking lever provided with a scrap-detaching finger located above the acting end of said lever, a spring which depresses said lever, and a cam formed to arrest the knocker in its downward movement after the detachment of the nail and to permit the completion of said movement after the opening of the cutting-dies, as set forth.

In testimony whereof I have signed my name to this specification, in the presence of two subscribing witnesses, this 12th day of March, A. D. 1889.

JAMES A. HORTON.

Witnesses:
C. F. BROWN,
A. D. HARRISON.